June 27, 1972   R. M. G. BOUCHER   3,672,823

METHOD OF STERILIZING LIQUIDS

Filed March 25, 1970   14 Sheets-Sheet 1

INVENTOR.
RAYMOND M.G. BOUCHER
BY
Samuelson & Jacob
HIS ATTORNEYS

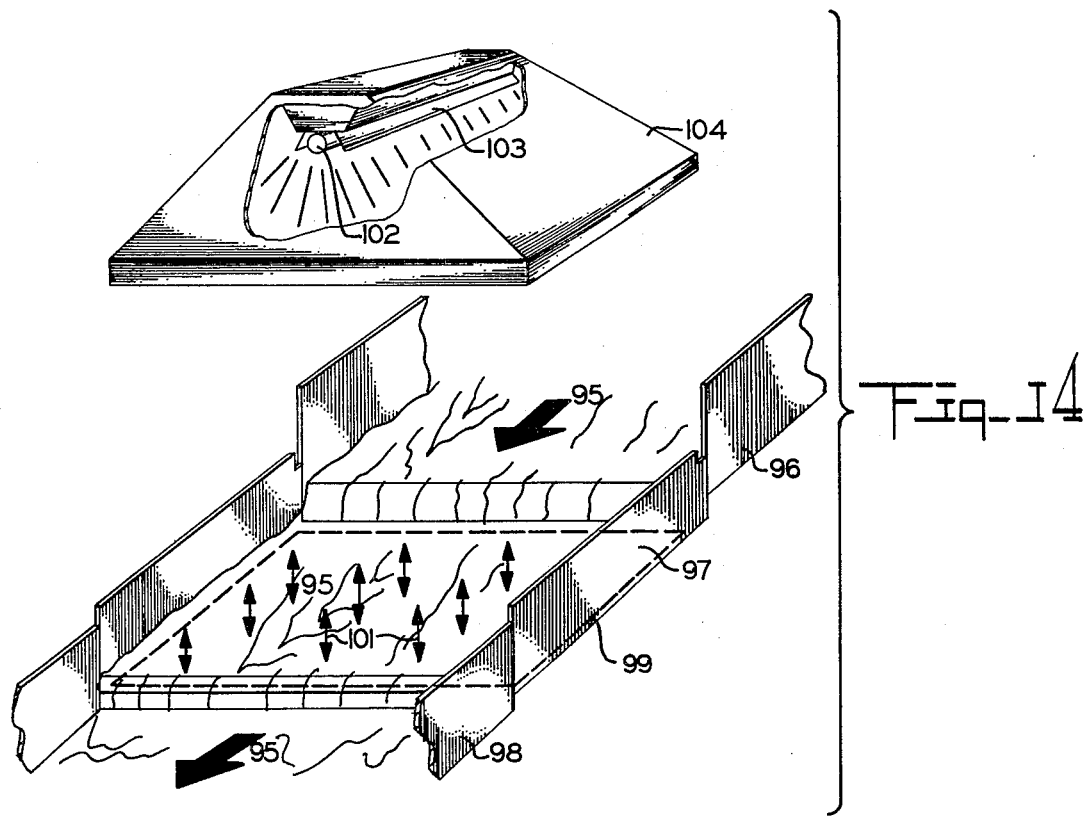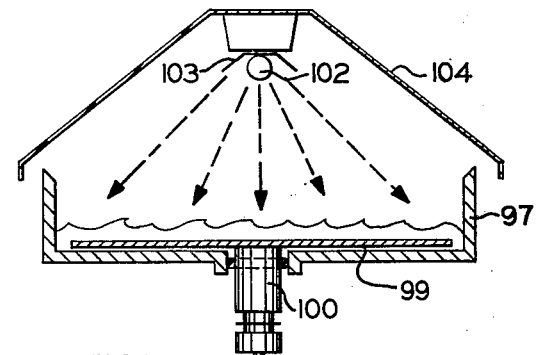

June 27, 1972  R. M. G. BOUCHER  3,672,823
METHOD OF STERILIZING LIQUIDS
Filed March 25, 1970  14 Sheets-Sheet 7
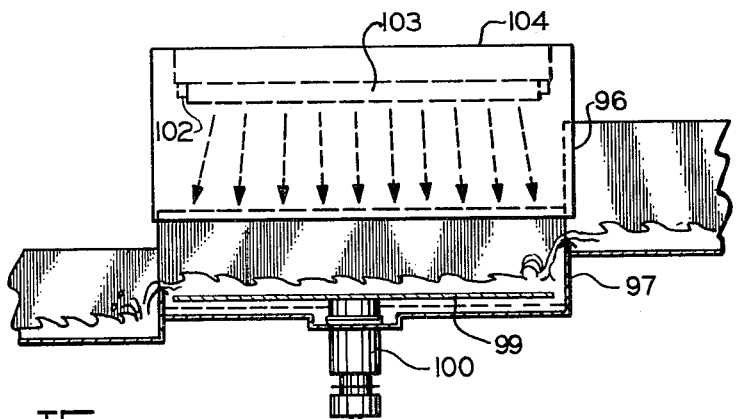
Fig_16
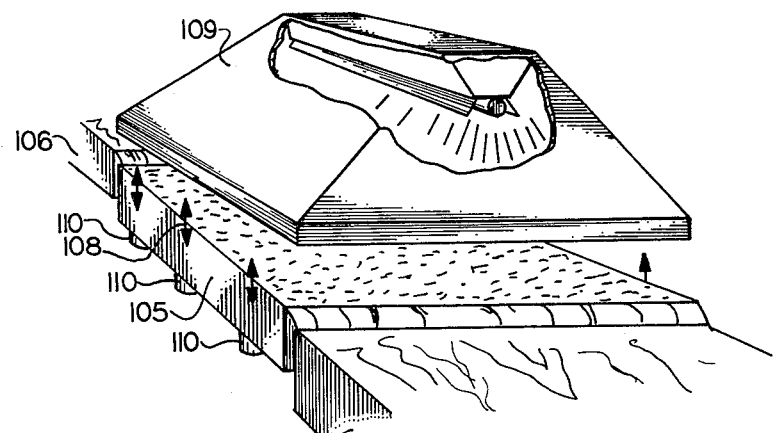
Fig_17
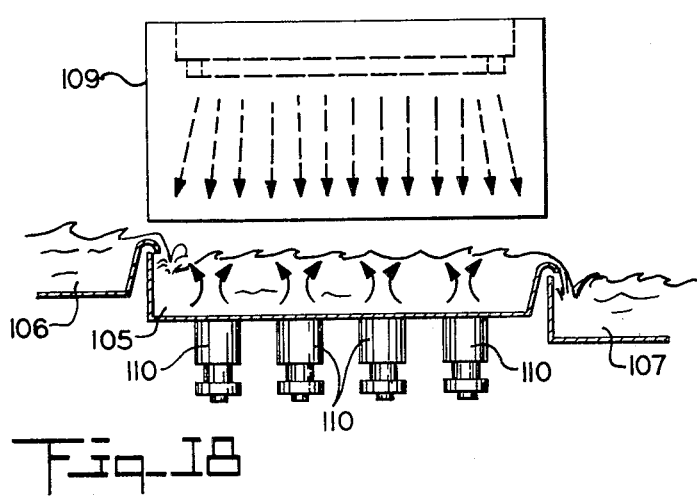
Fig_18
INVENTOR.
RAYMOND M.G. BOUCHER
BY Samuelson & Jacob
HIS ATTORNEYS

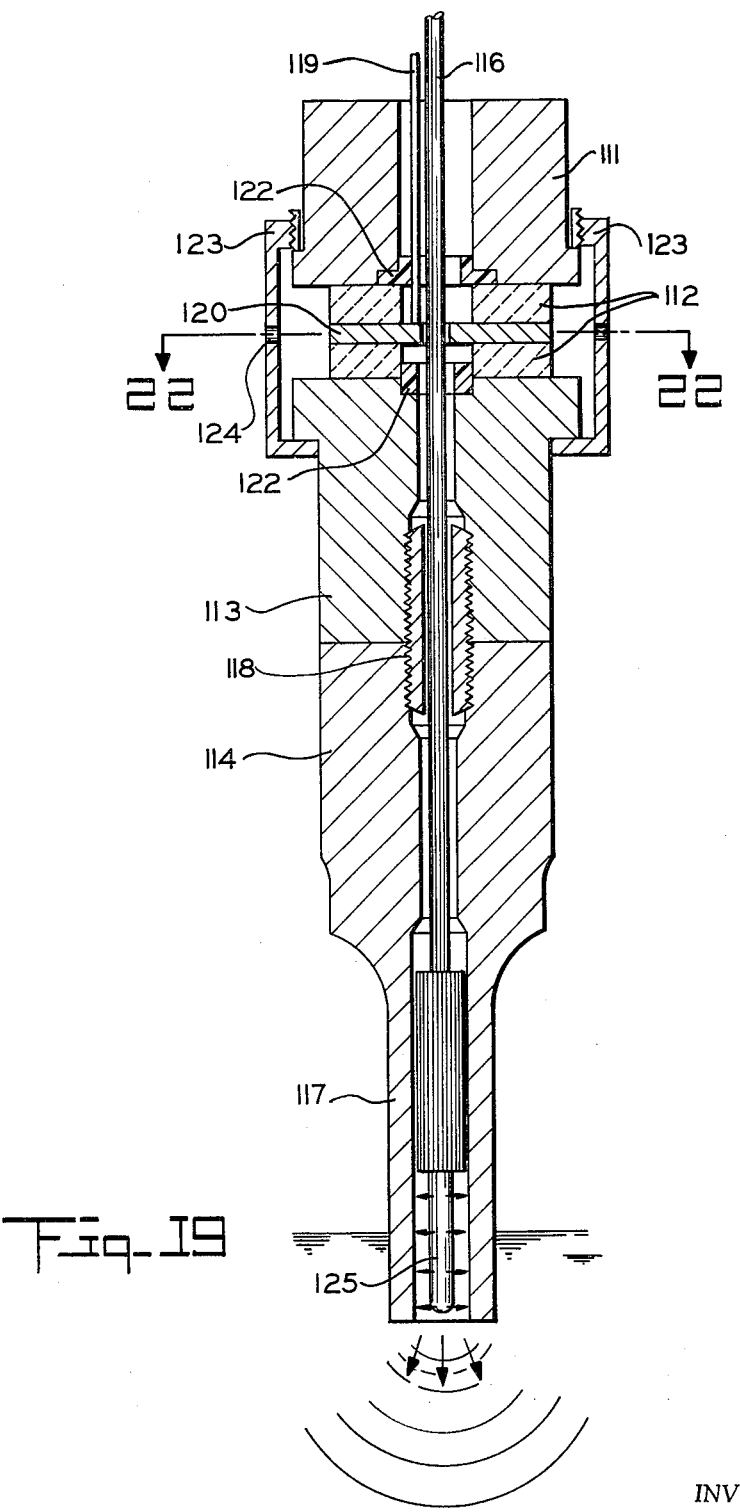

INVENTOR.
RAYMOND M. G. BOUCHER
BY
Samuelson & Jacob
HIS ATTORNEYS

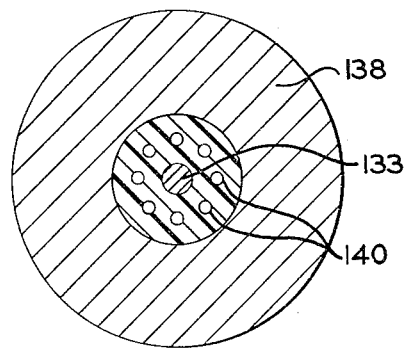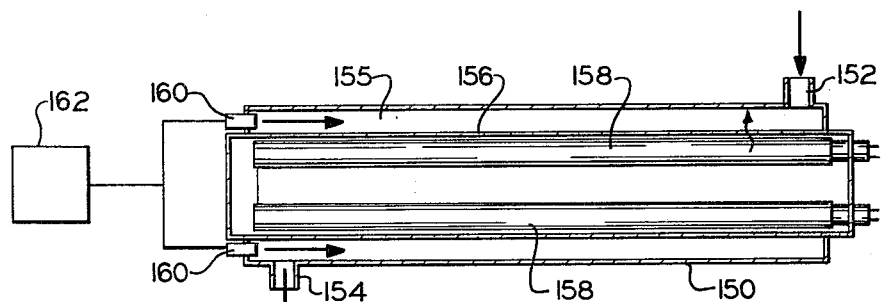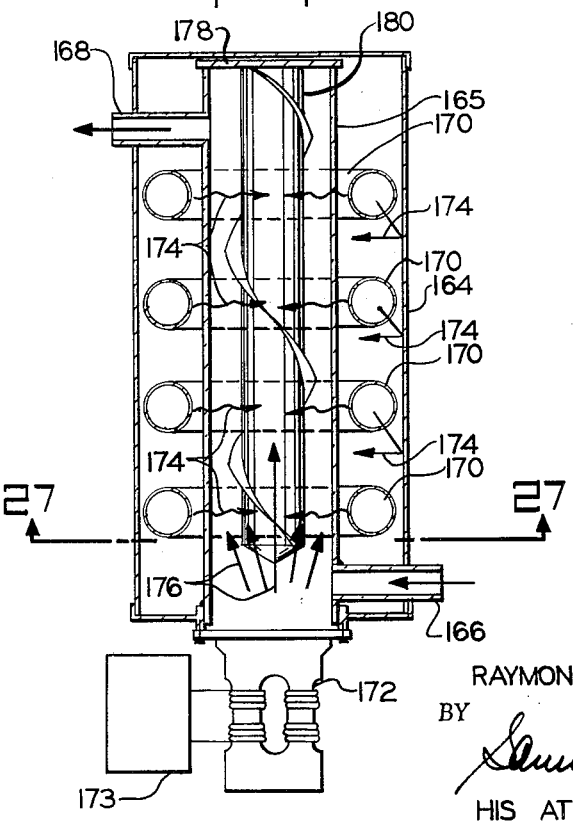

United States Patent Office 3,672,823
Patented June 27, 1972

3,672,823
METHOD OF STERILIZING LIQUIDS
Raymond Marcel Gut Boucher, New York, N.Y., assignor to Wave Energy Systems, Inc., New York, N.Y.
Filed Mar. 25, 1970, Ser. No. 22,419
Int. Cl. A61l 1/00, 3/00
U.S. Cl. 21—54 R                              3 Claims

ABSTRACT OF THE DISCLOSURE

Improved, economical method for the continuous or batch sterilization of bacteriologically contaminated liquids at increased liquid flow rates by means of the synergistic effects produced during the simultaneous and combined action of ultraviolet flux and high intensity acoustic waves in the sonic or ultrasonic range. The method involves the use of ultraviolet irradiation within the 1800 A. to 4500 A. region with intensities equal to at least 1 watt per square foot of processed area in air and 16,000 micro-watt seconds per cm.² in liquids while simultaneously subjecting the liquid to an acoustic field having a frequency of the order of between 5 and 150 kHz. and an average acoustic energy density level equal at least to 1 watt per liter in the processing chamber.

---

This invention relates to a method for the continuous sterilization or disinfection of liquids or liquid streams by combining the effect of ultraviolet energy with high intensity sonic and ultrasonic irradiation under well defined contact time and energy levels and to apparatus for carrying out the method.

It is well known that commercial sources of ultraviolet radiations, whose main wavelengths are of the order of between 1800 A. and 4000 A., have been extensively used in the past for water purification when it was dangerous or not practical to chlorinate, ozonate, or chemically treat the polluted water. Ultraviolet irradiation has also been successfully used in industry to purify liquids more viscous and more absorptive than water. For instance, satisfactory sterilization of sugar syrup (see Food Processing/Marketing, November 1965), wines, beer, milk, non-pasteurized fruit juices and proteinaceous solutions has been carried out for some time.

In the present state of the art, commercial ultraviolet sterilization of liquids has been greatly hindered due to the limitations imposed by the nature of the radiant ultraviolet energy and the characteristics of the processed liquids. These limitations will be reviewed briefly with a view toward explaining how the present invention will eliminate most of the difficulties encountered today in ultraviolet industrial sterilization.

The sterilizing action of electromagnetic radiations in the ultraviolet region (especially between 2000 A. and 3100 A.) is due to the release of powerful quantas of energy called photons. The energy of a quantum E is given by the product of $h \times f$, that is to say, $E=hf$ or $E=hc/\lambda$, where $h$ is the well known Planck's constant ($6.62 \times 10^{-27}$ erg-second) and $f$ is the frequency of the radiation. From the above formula one can see that the energy of an individual photon increases with the frequency of the radiation and decreases with its wave length. In other words, the photons emitted in the ultraviolet range become more destructive as the emission frequency is raised. Maximum bactericidal effectiveness is about 2900 to 3000 A., with progressively lower effectiveness through the visible light range.

The release of high energy photons in the "abiotic" region (i.e., between 2000 A. and 3100 A.) is believed to produce strong bactericidal effects because it corresponds to a maximum of absorption by DNA (deoxyribonucleic acid) and other nucleic acids. This has been supported by extensive laboratory studies which definitively showed a parallel between the germicidal action curve and the ultraviolet absorption curve of nucleic acids or nucleic acid components.

The germicidal effect of ultraviolet is therefore regarded as the result of chemical modifications produced at the molecular level (formation of thymine dimer, for instance, in DNA) by the quanta of energy absorbed in the irradiated material. To obtain a strong bactericidal effect one must release a certain number of quanta which must penetrate inside the processed microorganism and be of sufficient magnitude to initiate and maintain a given photoreaction. The amount of quanta with sufficient energy which can be released through a liquid depends, of course, on the degree of transmission of the ultraviolet energy through the liquid. It also depends, to a great extent, upon the turbulence level in the liquid.

In the case of water, for instance, (K. Dohnalik, Gaz. Voda. Tech. Sanit. 39, 14–16, 1965) one may say that ultraviolet transmission is an inverse function of its mineral and organic content. In practice the greater effect on ultraviolet absorption in water is due to dissolved iron salts, while alkali salts have very little influence. In a non-turbulent volume of water it has been shown that ultaviolet transmission $t$ varies exponentially with liquid depth $d$ and the absorption coefficient $\alpha$ according to the following formula: $t=e^{-\alpha d}$.

One can, therefore, understand that an efficient coupling of the ultraviolet energy through a liquid at the distances normally used in industrial sterilizing systems (i.e., a few inches) will require a relatively low absorption coefficient.

This explains why present ultraviolet sterilizers for liquids cannot be used to treat liquids darker than weak tea, if complete sterility is required. If a large number of small particles is present in the processed liquid, serious problems are created due to rapid dissipation of the quanta energy through scattering, reflection and absorption in the dispersed phase.

With a view toward exposing the entire liquid phase to the sterilizing radiation, it is common practice to increase the turbulence in the liquid by means of baffles and obstacles. However, a compromise has to be found with this practice since both the baffles arrangement and a too high degree of turbulence considerably increase the absorption coefficient $\alpha$.

It is an object of this invention to provide a method which will help to overcome some of the limitations due to the adverse effects of ultraviolet absorption in most liquids.

It is also an object of the present invention to considerably increase the liquid output through commercial ultraviolet sterilizers while maintaining both a hundred percent kill and a reasonable cost.

It is a further object of the present invention to increase the number and type of liquids or liquid suspensions which may be successfully treated in industrial ultraviolet sterilizers while maintaining both reasonable investment and running costs.

These and other objects, advantages, features and uses of the present invention will be apparent during the course of the following discussion.

To aid in the understanding of the present invention, the potential contribution of large amplitude sonic and ultrasonic waves to the mechanism of liquids sterilization when used alone and in combination with ultraviolet radiation will be reviewed briefly. First, the release of high intensity acoustic waves (emission frequency comprised between 5 kHz. and 150 kHz.) in contaminated liquids at pressures equal or slightly higher than atmospheric pressure will be discussed. Although a little complex at first sight, the physical action of sonic or ultrasonic waves can be brought into play in four major ways, namely, through large variations of pressure, motion, heat degradation or electrical phenomena. The acoustic energy is transmitted through the liquid by the back and forth motion of the molecules along the direction of propagation. This produces alternate adiabatic compressions and rarefactions, together with corresponding changes in density and temperature.

In the case of a plane acoustic wave transmitted through a liquid like water at an intensity of 10 watt/cm.$^2$, one can calculate that the water molecules will oscillate with a motion amplitude of the order of three microns (assume the emission frequency equal to 20 kHz.). The molecular accelerations at the end of the molecular excursions will be five thousand times greater than the acceleration due to gravity and considerable pressure changes (a few atmospheres) will occur at any given point in the liquid twenty thousand times each second. Since the pressure is increased and decreased alternately, it is understandable that during the negative pressure phase a point may be reached at which the natural cohesive forces of the liquid will be overcome. Then a new phonomenon known as "cavitation" takes place. It corresponds to the formation and rapid collapse of small cavities through the entire liquid. According to the energy density level the cavities are filled with gas or vapor. In the latter case, their collapse produces very large amplitude shock waves (up to several hundred atmospheres) with local temperatures up to a few hundred degrees centrigrade or more. Electrical discharges are also believed to occur during the collapsing phase, this is called the sonoluminescence effect.

Let use now consider what could happen to both the liquid molecules and the water-borne microorganisms (pathogens, viruses, vegetative cells of fungi, algae and spores) submitted to an acoustic field of the type described above. Due primarily to the effects of electrical discharges (ionization), "hot" points in the liquid, and sharp pressure waves gradients, the molecular bonds of water will be severed and free radicals OH and H will then be produced.

Chemically active hydroxyl radicals and hydrogen atoms will be available in the water solution to trigger several types of chemical reactions which will lead to bactericidal compounds such as water peroxide. (See I. E. Elpiner, Ultrasound, p. 20, Chapter 2, Consult. Bur. ed. New York 1964.) If other chemicals are present in the water stream, other molecular bond breakages could take place. With carbontetrachloride one will observe, for instance, the production of free chlorine (S. P. Liu, Chlorine Release Test for Cavitation Activity Measurements, J. Acoust. Soc. Am., Vol. 38, No. 5, 817–826, November 1965) and with potassium iodide the liberation of iodine (D. E. Goldman and G. R. Ringe, Determination of Pressure Nodes in Liquids, J. Acous. Soc. Am., vol. 21, 270, 1949). It is known that alkyl and aryl halides in aqueous suspension, irradiated at low frequency, are hydrolysed to produce a halide ion and the corresponding hydroxyl compound or ether (A. E. Crawford, Ultrasonic Engineering, p. 212, Chapter 9, London, Butterworths Sci. Publ., 1955). The production of highly bactericidal compounds such as ozone can also be the result of low frequency sonic irradiation of oxygen saturated water. (M. Haissinsky and A. Mangeot, Nuovo Cimento, 4:5, 1086, 1956.) Nitrous acid, nitric acid and nitrogen oxides can also be detected in small amounts during the insonation of water saturated with air or nitrogen. In short, it can be said that low frequency (5 to 150 kHz.) high intensity (higher than 0.1 watt/cm.$^2$) acoustic emissions may alone produce free radicals, atoms, ions or new chemicals with strong bactericidal powers. Beside the production of new chemicals or active radicals which could be toxic to most pathogens, spores, algae or water-borne microorganisms, it is important to consider in detail the other physical mechanisms which may affect the life of unicellular or multicellular organisms under ultrasonic irradiation.

Large amplitude sonic and ultrasonic waves, inside the frequency range previously stated, will considerably modify the ion exchange processes through the cell membranes. This modification of the diffusional process through inert or living membranes is well known in the art. Along these lines, there is, for instance, the early work of J. H. Rees (Mast. Thesis, Mass. Inst. Techn., 1948) on the influence of low frequency insonation (10 to 30 kHz.) on the dialysis constant. The enhanced membrane diffusion observed during insonation can be interpreted as the complex result of the radiation pressure, the acoustic pressure and cavitation on the motion of individual ions or molecules. Each ion or molecule receives a supplementary amount of energy in a high intensity acoustic field, and it "boosts" its level of activity. This could be, for instance, an extra "push" due to the passage of fast travelling cavitation shock waves resulting from the collapse of a resonant bubble. (I. Schmid, Acustica, 9:4, 321–326, 1959.) But the effect of acoustic waves on the membrane structure must also be carefully considered. The enormous localized pressure waves which can rip apart metal particles during intense vapourous cavitation can indeed loosen macromolecular structures, such as the cell walls of water-borne microorganisms. By doing so, pressure waves associated with the acoustic field can change the permeability of the walls and membranes of living cells. This would explain, for instance, why low frequency (5–150 kHz.) high intensity (above 0.1 watt/cm.$^2$) ultrasound waves increase the sensitivity of microorganisms to disinfectants. It has been shown, for instance, a few years ago (L. I. Elpiner, Gigiena I Sanit, USSR, 7:26, 1958) that the sterilization of aqueous suspensions of E. coli previously irradiated at 20–25 kHz. requires much lower concentration of bactericides than the treatment of the same type of unirradiated suspensions.

In other words, one can conclude that ultrasonic irradiation of contaminated liquid streams at low frequency, high intensity, and with reasonable contact time may lead either to the production of compounds which would be toxic to the water-borne microorganisms or to cells structure modifications which will be lethal to the same microorganisms.

However, it should be noted that the destruction of bacteria, spores or viruses suspended in liquids very often gives survival curves of a nearly logarithmic shape. This means that a 100% kill is rarely achieved even with high acoustic power densities (several watts per cubic centimeter) and long contact times (more than thirty minutes). This explains why ultrasonic irradiation alone has not found many applications for industrial sterilization of liquid streams. The purpose of the present invention is to provide an economical solution to the problem of the destruction of water-borne or liquid-borne microorganisms by the proper use of the synergistic effects which take place when irradiating the polluted liquid or liquid stream with the combined use of ultraviolet and ultrasonic energy under well defined experimental conditions.

I have found that the strong turbulence created within a few inches from the vibrating face of a transducer or series of transducers can efficiently supplement or even totaly replace the turbulence created by baffles in the tube type continuous sterilizers which are presently used. I have also found that by locating the ultraviolet source in a pressure antinodal region, maximum cavitation activity at the glass tube interface can be maintained, thus continuously cleaning the glass-liquid interface and eliminating mechanical tube sweepers. This avoids the accumulation of impurities which is one of the main causes of the relatively short life of under water ultraviolet sources. The impurities quickly absorb the ultraviolet quanta whose energy is degraded into heat.

It will be seen later that the practical life of an ultraviolet source can be tremendously increased when it is properly positioned in a highly cavitating area. If the ultraviolet source operates at a distance of less than two inches from the ultrasonic transducer there is, in general, no need to place it at a pressure antinode (at 25 kHz., the wave length in water is 5.72 cm.) since the cavitation level is always high enough at such close distance from the vibrating face of the transducer to obtain good cleaning.

I have also found that a better repartition of ultraviolet quanta throughout the liquid results from the combination of a low frequency (5 kHz. to 150 kHz.) cavitating field with an underwater ultraviolet germicidal lamp. Besides the two above mentioned effects, which are due to the physical turbulence (micro and macro-streaming) created by the ultrasonic emission in the liquid, a strong sensitisation to ultraviolet quanta has been observed with all microorganism used in the tests I have made (DNA, RNA, viruses, bacteria, spores, algae, phages, unicellular and multicellular organisms). This, more probably, is due, as previously mentioned, to a weakening of molecular structures or cell membranes under the continuous pounding of cavitation shock waves which results in a deeper penetration of energy quanta inside the living microorganisms. The combined effect of both ultrasonic and ultraviolet energy creates a strong "sonophotolysis" effect which, for the first time, accomplishes the efficient, continuous sterilization of liquid streams whose color is even darker than weak tea. It also enabled me to increase the flow rate of standard polluted water streams four or five fold as compared with the capacitiy of present, industrial ultraviolet sterilizers. This tremendous output increase was achieved without any increase in the ultraviolet level (maintained above 16,000 micro-watt seconds per sq. cm.). The addition of a high intensity acoustic field in the irradiated area accomplished this greatly improved results. To carry out the purposes of the invention, it is necessary to produce the acoustic fields needed to obtain a strong sonophotolysis effect.

It is also important to note that sonophotolysis effects exist in high intensity acoustic fields even in the absence of cavitation. This can easily be demonstrated by increasing the hydrostatic pressure above the irradiating liquid. As is well known (Sonics by T. F. Hueter, published by John Wiley and Sons, 1955) that by doing so, one shifts the cavitation threshold to higher acoustic energy levels. The high intensity acoustic field then produces synergistic microbiocidal effects without any trace of gaseous or vaporous cavitation. This clearly demonstrates the advance of the present invention which is based upon modifications at molecular level over the prior art which merely suggested using the physical effects of cavitation to remove deposited particles or impurities from the surface of ultraviolet radiant tubes.

In the accompanying drawings, forming a part of this application, and in which like numerals are employed to designate like parts throughout the same:

FIG. 12 is a view similar to that of FIG. 1 of a further embodiment for carrying out the method of the invention, utilizing a cold cathode, mercury vapor lamp;

FIG. 14 is an exploded, perspective view of a processing tank utilizing the teachings of the invention;

FIG. 15 is an end elevational view of the processing tank of FIG. 14;

FIG. 16 is a side elevational view of the processing tank of FIG. 14;

FIG. 17 is a perspective view of an embodiment for carrying out the method of the invention utilizing a continuous sterilizing cell;

FIG. 18 is a side elevational view of the sterilizing cell of FIG. 17;

FIG. 19 is a vertical sectional view of a portable embodiment utilizing the method of the invention for spot processing of contaminated fluids;

FIG. 24 is an enlarged, sectional view taken on the lines 24—24 of FIG. 23;

FIG. 25 is a longitudinal view of a still further embodiment utilizing the method of the invention wherein the source of ultraviolet emission is very close to the liquid being treated;

FIG. 26 is a longitudinal view partly in section, of a still further embodiment for carrying out the method of the invention;

Figure 1:
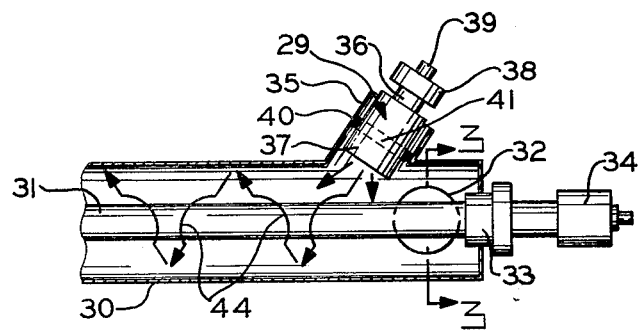
FIG. 1 is a diagrammatic, longitudinal view of one embodiment of processing chamber for carrying out the method of the invention, utilizing a piezoelectric ceramic transducer.

In the drawings, wherein, for the purpose of illustration, are shown various embodiments for carrying out the method of the invention, the numeral 31 designates an ultraviolet tube which is positioned in the center of cylindrical chamber 30 (FIG. 1). Ultraviolet tube 31 is preferably of fused quartz and it irradiates the liquid which enters sideways of the chamber through inlet port 32.

The ultraviolet tube 31 is maintained in position by compression fittings 33. The electrical socket 34 can be seen at the extreme right end of the tube. A cylinder 35 has been brazed or welded to the upper section of chamber 30 to house the ultrasonic transducer 29. The angle between the transducer cylinder axis and the main axis of the irradiation chamber varies between 90° and 50° according to the type of installation.

The transducer 29 itself can consist of either a flat cylindrical ceramic made of a piezoelectric material (barium titanate, lead zirconate titanate, cobalt barium titanate, etc.) inserted in a mounting support or it can be, as shown in FIG. 1, a Langevin type sandwich. This type of high power transducer is a sandwich composed of a thin slice of piezoelectric material 36 squeezed under pressure between two metal blocks 37 and 38. The whole assembly can be excited into resonance at a frequency governed by the dimensions of the blocks. One of the more efficient sandwiches used in the invention consisted of a front quarter-wave plate of steel. Aluminum front blocks (parallelepipedic or circular in shape) whose height was close to a quarter-wave length with two cylindrical ceramics (1½ inch diameter and ¼ inch thickness) squeezed with an aluminum back plate whose height was approximately ⅛ of the emission wave length were also used successfully. Compression of the ceramic was achieved through a four bolts type arrangement (one at each corner when using square shaped blocks) or a single axial bolt arrangement 39, as seen in FIG. 1. The compression torque value was of the order of between 500 and 250 pound-square inch per inch. In the embodiment shown in FIG. 1, the metal front block was fastened under compression inside the cyllinder 35 by means of one neoprene O-ring 40 which rested on a circular throat 41 positioned at a minimum distance of ¼ inch from the vibrating face of the transducer. This was one of several techniques used in the invention to fasten the transducer into the ultraviolet processing chamber. Other transducers fastening techniques will be described later in the course of this description.

In some cases, of course, when a high flow rate is involved, several transducers may be mounted in various positions around the axis of symmetry of the chamber. The left side of the irradiation chamber is not seen in FIG. 1 since it is the same as the right side except for the transducer. The liquid outlet port is situated either on the same side as the inlet port 32 or on the opposite side according to the space requirements of the installation.

Figure 2:
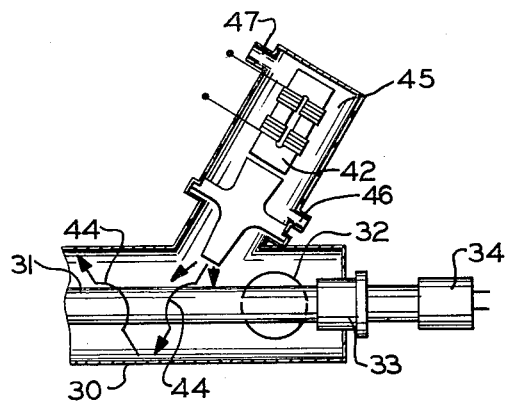
FIG. 2 is a view similar to that of FIG. 1 of another embodiment of processing chamber for carrying out the method of the invention, utilizing a magnetostrictive transducer.

As seen in FIG. 2 the piezoelectric ceramic type transducer can be replaced by a magnetostrictive type transducer 42. In this case the front metal block 37 is designed so that there is maximum motion (antinodal) region at the radiating interface. This corresponds to a whole number of half wave lengths. Indeed, within the scope of the present invention, any material, which exhibits electrostrictive characteristics, can be used (for instance, ferrites) as the driving element of the transducer assembly.

Figure 3:
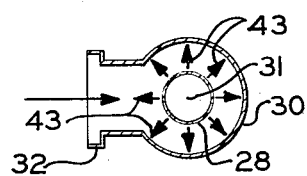
FIG. 3 is a sectional view, taken on the lines 3—3 of FIG. 1, viewed in the direction of the arrows.

The contaminated liquid is admitted inside the sterilizer through the sideway inlet 32, shown in FIGS. 1 and 3. The ultraviolet tube 31 is protected from direct contact with the liquid by fused quartz sleeve 28 and irradiates radially, as shown by arrows 43, inside the processing chamber. The high intensity beam of ultrasonic energy impinges against the liquid stream as shown by arrows 44. The overall path length of the ultrasonic beam is, when possible, calculated to take advantage of resonant conditions inside the processing pipe. To observe an efficient killing of liquid-borne microorganisms at 2537 A. wave length, a minimum ultraviolet intensity of 16,000 microwatt seconds per cm.² (this unit is also called an "ultrad") is needed while the acoustic energy density in the irradiated chamber must average at least 1 watt per liter. In practice, I have found that the maximum synergistic killing effect, which can be achieved under economical conditions, corresponded to a combination of an ultraviolet intensity of 30,000 ultrads at the 2537 A. wave length with an acoustic energy level of 20 to 40 watts per liter at a frequency of the order of between 16,000 and 45,000 Hz. Under such conditions, which correspond to a highly cavitating field (vaporous cavitation), the liquid sterilizing capacity of the ultraviolet system can be increased at least by a factor of two to four. Reference here is to the treatment of a fluid medium with up to 15 p.p.m. turbidity and 10 p.p.m. color, or a total maximum absorption coefficient of 0.2 per cm. The magnitude of the biocidal synergistic effect is obviously a function of the acoustic energy density level in the irradiated fluid and a significant increase in microorganisms killing rate is observed when the acoustic energy density increases sharply above the minimum threshold of 1 watt per liter of irradiated chamber. Without departing from the frame of the present invention one can, of course, reach high energy density levels by means of a single or a plurality of high power transducers which can be either air cooled or liquid cooled.

In FIG. 2, for instance, there is seen a cooling jacket 45 into which water is recycled through the inlet 46 and outlet 47 to cool the magnetostrictive transducer 42. It must be also understood that the metal front blocks which act as velocity transformers can be designed of any shape (step horn, catenoidal, conical or exponential horns) to concentrate the acoustic energy as long as they maintain the critical output level of 1 watt per liter of irradiated chamber.

Figure 4:
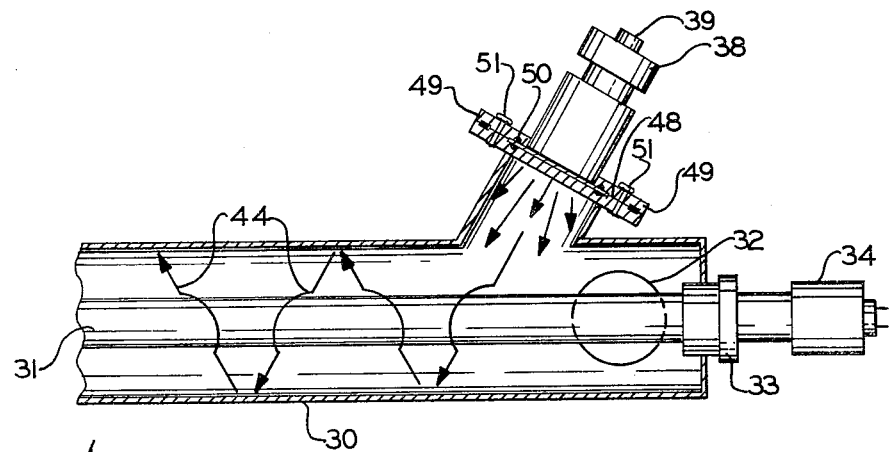
FIG. 4 is a view similar to that of FIG. 1, showing a modified mounting arrangement for the piezoelectric ceramic transducer.

FIG. 4 shows another embodiment of the present invention. In this arrangement the Langevin sandwich type transducer (it could be any other previously-mentioned transducing element) is fastened to the cylinder 35 by means of a flange. The metal front block is attached by means of epoxy to a thin vibrating metal membrane 48, which is compressed inside the flanges 49 by means of a double rim O ring seal arrangement 50. Several peripherical bolt-nut combinations 51 maintains a tight uniform compression to make this set up leakproof. To avoid confusion in the understanding of the invention, the electrical leads which bring the high frequency current to the electrostrictive material (ceramics, magnetostrictive elements or ferrites) are not shown since the technique is well-known to those skilled in the art.

Figure 5:
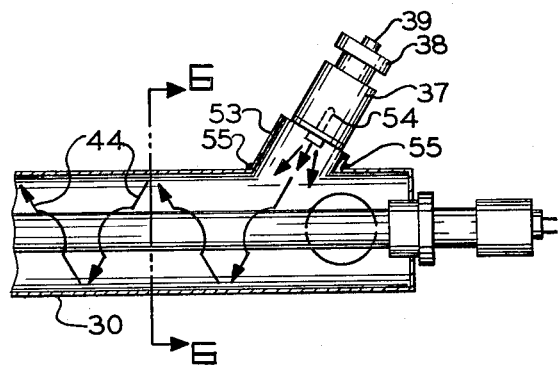
FIG. 5 is a view similar to that of FIG. 1, showing a further modified mounting arrangement for the piezoelectric ceramic transducer.
Figure 6:
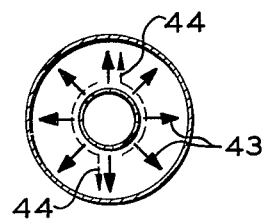
FIG. 6 is a sectional view, taken along the lines 6—6 of FIG. 5, viewed in the direction of the arrows.

FIG. 5 shows another mounting of the ultrasonic transducer which is a permanent fastening of the type often used today in some ultrasonic cleaning tanks. The metal front block is attached by means of epoxy or similar material to the thin metal plate 52 (maximum thickness ⅛ inch) which forms the base of cylinder 53. If needed, an axial bolt 54 may be added to strengthen the whole transducing assembly. The support cylinder 53 is, for instance, made of the bottom section of a stainless steel beaker whose edges, properly cut, may be butt welded to the irradiating chamber 30 as shown at 55. According to the type of metal used for the velocity transformer front block, this piece may be brazed or welded in place rather than attached by epoxy. The type of construction used in FIG. 5 provides a perfectly leakproof permanent arrangement, but it makes replacement of parts or the totality of the transducing elements more difficult. A cross sectional view of the irradiation chamber is shown in FIG. 6. The arrows 43 and 44 give an indication of the relative positions of the main ultraviolet and ultrasonic emissions, respectively.

Figure 7:
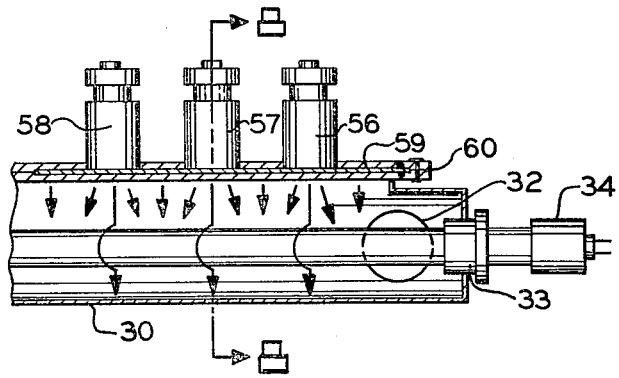
FIG. 7 is a view similar to that of FIG. 4 of a further embodiment for carrying out the method of the invention, utilizing a plurality of piezoelectric ceramic transducers.
Figure 8:
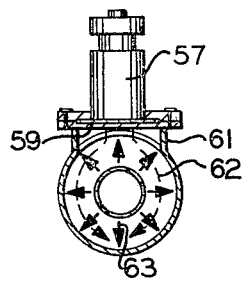
FIG. 8 is a sectional view taken on the lines 8—8 of FIG. 7, viewed in the direction of the arrows.

FIG. 7 is a longitudinal cut of processing chamber 30 which uses a combination of several ultrasonic transducers emitting a right angle to the direction of the fluid stream. These transducers 56, 57 and 58 are permanently fastened to a flat thin metal plate (maximum thickness ⅛ inch) which is maintained in position through compression joints in the flange 60. In the particular application shown in FIGS. 7 and 8 the vibrating plate which conveys the acoustic energy into the liquid stream is of rectangular shape. However, without departing from the spirit of the invention this coupling plate 59 can be of a different shape. It can also be permanently fastened to the upper part 61 of the processing vessel by a technique such as previously shown in FIG. 5. FIG. 8 is a cross sectional view of the processing chamber FIG. 7 taken on the lines 8—8 and shows the relative position of the ultrasonic (arrows 62) and ultraviolet (arrows 63) emissions. Ultrasonic irradiation by means of a plurality of transducers, driven by separate generators or from a single high frequency power source, enables one to increase the acoustic energy density level to values higher than 30 watts/liter thus considerably boosting the sterilizing capacity of a single tube arrangement. Limitations were only encountered in the experiments due to the increase in pressure drop when the liquid flow increased to high values in the processing chambers.

Figure 9:
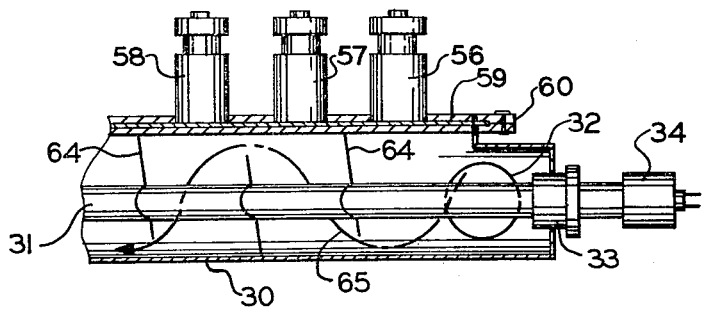
FIG. 9 is a view similar to that of FIG. 7 including a plurality of internal baffles for increasing the liquid turbulence.

FIG. 9 shows a multiple transducer arrangement similar to the one of FIG. 7, to which baffles 64 have been added to increase liquid turbulence and lengthen the contact time inside the processing chamber. Each transducer is positioned to create maximum cavitation inside each individual compartment, i.e., between two successive baffles 64. Arrow 65 indicates the water or liquid path inside irradiation chamber. Such an approach is particularly suited for the treatment of viscous and colored liquids with a coefficient of absorption greater than 0.2 per cm.

Figure 10:
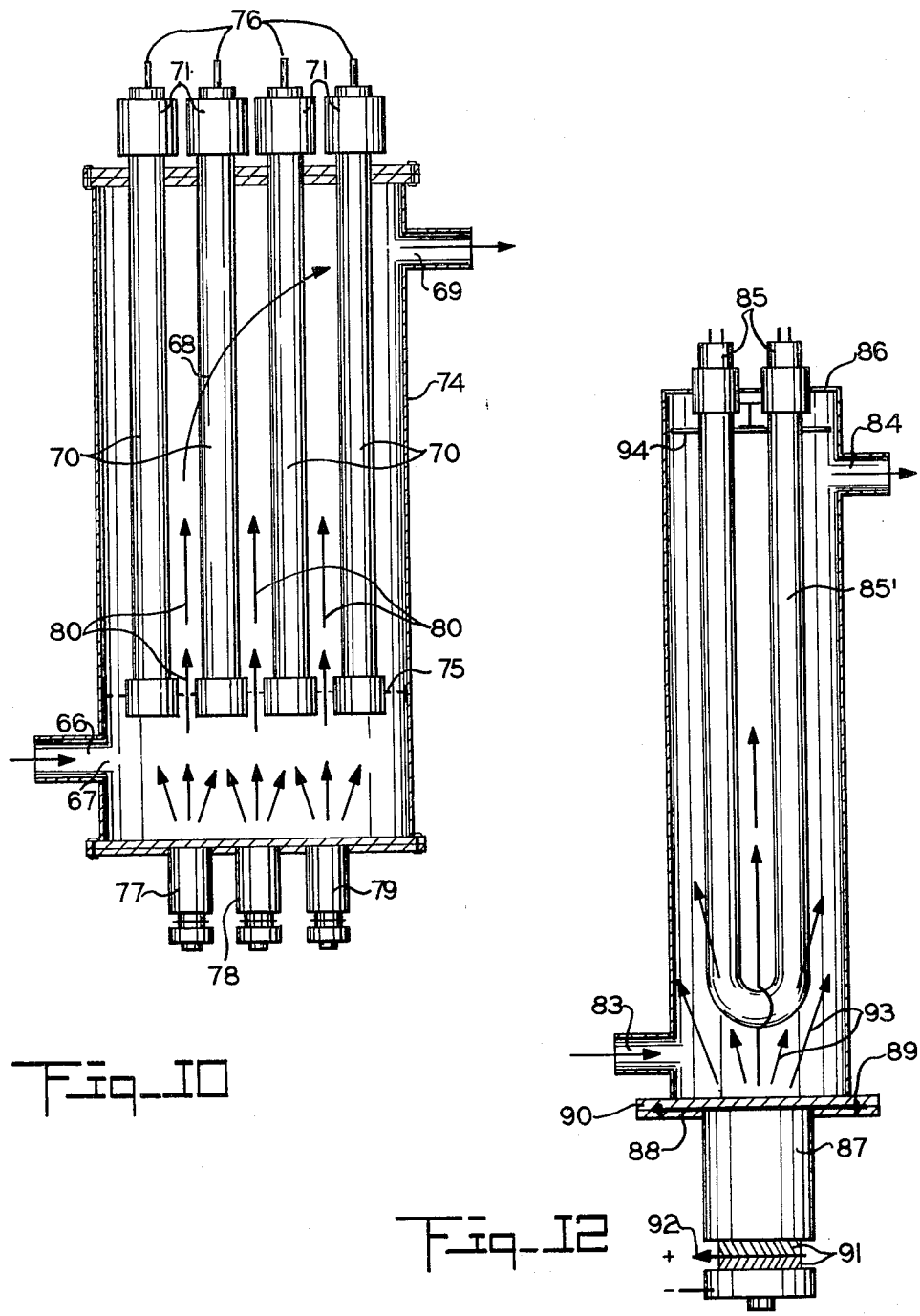
FIG. 10 is a view similar to that of FIG. 1 of a further embodiment for carrying out the method of the invention, utilizing a plurality of ultraviolet tubes and a plurality of piezoelectric ceramic transducers.

FIG. 10 is the vertical cross section of a multi-ultraviolet tubes unit for the sterilization of large liquid flow rates. This type of industrial sterilizer (Ultradynamics, model 500–1 to 12000–4) can handle, for instance, up to 12,000 gal. per hour of contaminated water when individual units are coupled to each other in series or in parallel. FIG. 10 shows how ultrasonic transducers 77, 78 and 79 are fastened into such an industrial sterilizer to take advantage of synergistic effects. As can be seen, the contaminated liquid 66 is introduced through opening 67 into the lower section of the irradiating chamber. It flows upward as indicated by arrow 68 and leaves the purifier through the outlet pipe 69. A series of vertical ultraviolet tubes protected by fused quartz jackets 79 produce a powerful (30,000 microwatt seconds per sq. cm.) 2537 A. emission in a radial direction. The tube head 71 are fastened to the main section of the processing chamber 74. A spider type frame 75 supports the lower end of the ultraviolet tubes. Each irradiating tube is connected to a remote power supply by an electrical cable 76 (connection details not shown). Several transducers 77, 78 and 79 are fastened on the bottom lid and they emit energy in a vertical upwards direction (arrows 80 concurrent with the liquid stream). The transducers shown in FIG. 10 are epoxy-coupled to a metal membrane described above and shown in FIGS. 4 and 7, but they could be fastened by other suitable means.

Figure 11:
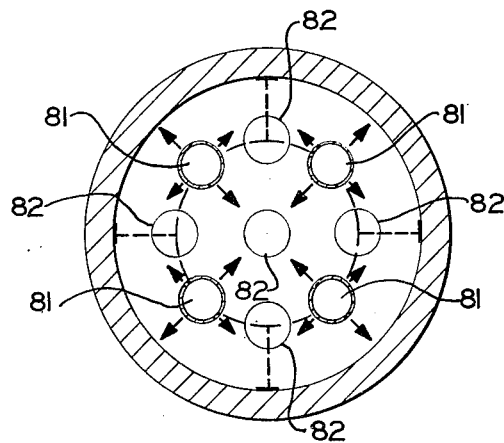
FIG. 11 is a sectional view taken of a further embodiment for carrying out the method of the invention similar to that shown in FIG. 10.

The transducers are positioned in such a manner that their main axes will be parallel to the ultraviolet tubes and each transducer is spaced at mid distance between two adjacent tubes. This affords better transmission and utilization of the acoustic enregy while also allowing an efficient and permanent cleaning of the tubes jacket. FIG. 11 shows a cross sectional view of an industrial sterilizer of this type equipped with four ultraviolet lamps 81 (total UV output, 53 watts, 30,000 ultrads) and five ultrasonic transducers 82. Such a unit can, for instance, with ultraviolet radiation, sterilize up to 2000 gallons per hour of contaminated water with an absorption coefficient of 0.2 per cm. When the five transducers are turned on at a frequency between 15 and 30 kHz. and with an output which corresponds to 15 watts per liter of irradiated chamber, the water flow rate can be doubeld. By increasing the acoustic energy density up to 35 watts per liters one will still maintain a 100% killing of water borne micoorganisms while quadrupling the liquid flow.

FIG. 12 shows another embodiment of the invention which consists of a U shaped Hanovia cold cathode, low pressure, mercury-vapor lamp 85' mounted in a cylindrical chamber with an ultrasonic emitter irradiating upwards near the tube bend. The contaminated liquid is introduced at the lower left side of the processing chamber through pipe 83 near the region of maximum caviation. The liquid flows upwards and leaves the chamber through the pipe 84 after sterilization. Ultraviolet tube sockets with electrical connectors 85 are fastened to the upper lid 86.

Figure 13:
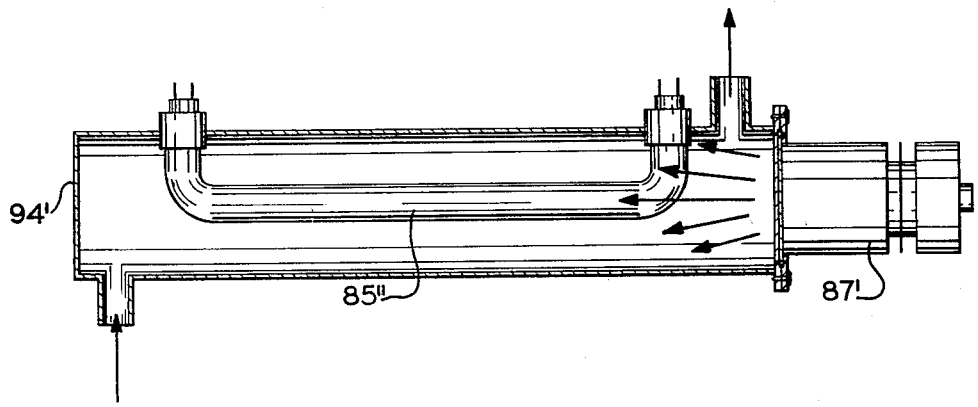
FIG. 13 is a view similar to that of FIG. 1 of a still further embodiment for carrying out the method of the invention which may use either a high pressure or a low pressure, mercury vapor lamp.

The ultrasonic transducer 87 (Langevin sandwich type) is fastened at the bottom of the processing chamber. It is expoxied to a thin metal membrane 88 which is squeezed between flexible joints 89 (neoprene O ring, for instance) inside the flange 90. As previously stated, other standard transducer fastening techniques may be used without departure from the spirit of the present invention. The Langevin type transducer shown in FIG. 12 comprises a quarter wave metal front block (aluminum, titanium, magnesium, etc.) two doughnut shaped piezoelectric ceramic transducers 91 (Clevite PZT–4, for instance) and a ⅛ wace length metal back plate (stainless steel, aluminum, etc.). A central bolt with spring washers holds together the whole assembly. Between the two ceramics a thin electrically conducting metal membrane 92 is connected to the positive side. As shown by arrows 93, we have a high intensity acoustic field in an upwards direction parallel to the liquid flow. The reflecting plate 94 is positioned at a distance $n\lambda/2$ ($n$ is a whole number) to take advantage of resonant conditions inside the column of liquid. In other words, the position of the reflecting plate corresponds to a pressure antinodal region. The output of the transducers is computed to deliver an acoustic energy density higher than one watt per liter of processing chamber. FIG. 13 shows another type of tube configuration 85'' which can shows another type of tube configuration 85'' which can be used with both low and high pressure mercury vapor lamps. Here again, the end plate 94' is spaced at a distance from the head of transducer 87' which corresponds to maximum resonant condition.

Since it is easier to transmit ultraviolet radiation through a gas than through a liquid, I successfully developed, as part of the present invention, a technique which involves a combination of airborne ultraviolet emission with the sonic and ultrasonic irradiation of the liquid films. In this approach, the thin layer of contaminated liquid is subjected to a strong high intensity acoustic field whose average level is approximatively 40 watts per square foot at a frequency comprised between 5 kHz. and 150 kHz. Under such conditions, a strong turbulence due to cavitation shock waves is established inside the liquid film and this results in all the liquid molecules and suspended microorganisms being exposed to the lethal airborne ultraviolet radiation. The ultrasonically weakened microorganisms are easily destroyed if the flowing liquid remains exposed for at least one second to the ultraviolet field which has a minimum intensity of 1 watt per square foot.

FIGS. 14, 15 and 16 show another embodiment of the invention. As can be seen, the liquid film 95 flows in a downwards direction from container 96 to 97 and from 97 to 98. Several container elements can be used in series or parallel. The ultrasonic energy is conveyed to the liquid by means of a vibrating metal plate 99 which is coupled to one high power transducer 100. Arrows 101 symbolize the vertical up and down motion of the vibrating metal plate which maximizes the impedance load. The airborne ultraviolet emission is provided, for instance, by a standard ultraviolet lamp 102 (such as Hanovia, Letheray, Arc tube, Atlantic Ultraviolet Hygeaire) with deflectors 103 which is placed in a hood 104 to concentrate the germicidal energy. For the sake of drawing clarity, the lamp-hood assembly is shown in FIG. 14 as lifted at a certain distance above the container 97. In normal operation, the ultraviolet lamp assembly will be positioned as seen in FIG. 15, which is an end view of container 97 with associated elements and FIG. 16 is a longitudinal view of the container 97 and the hood 104. It is obvious that without departing from the spirit of the present invention one can use different means to fasten the transducer to container 97. A single or a plurality of transducers of different types (magnetostrictive, ferrites, etc.) can indeed be coupled to the vibrating plate 99.

FIG. 17 is another embodiment of the present invention. It shows a perspective view of a continuous sterilizing cell which consists of a shallow type ultrasonic cleaning tank coupled to an airborne ultraviolet emitter. The ultrasonic tank 105 is equipped with several transducers 110 fastened in a standard manner to the bottom of the tank. For continuous processing the liquid overflows from the container 106 down to 105 and from 105 to 107, which is placed at the lower level. The maximum height of the liquid in the ultrasonic tank is a half wave length of the fundamental of the ultrasonic emission. The curved arrows in FIG. 18 indicate the direction of the main convection currents inside the liquid while arrows 108 in FIG. 17 show the type of up and down main motion created in the liquid by the ultrasonic emission. The hood and ultraviolet lamp fixtures 109 are of the same type as the one previously shown in FIG. 14. Enough piezoelectric transducers 110 are fastened to the bottom of the tank to produce an acoustic field in the liquid phase whose intensity is comprised between 1 and 50 watts per liter. For the sake of clarity of the drawing, the ultraviolet hood 79 has been represented in FIGS. 17 and 18 slightly lifted above its normal position.

FIGS. 14 and 17 illustrate two successful set ups used in the experiments for the continuous processing of liquid streams (such as blood or plasma, for instance). It is, however, understood that the same type of arrangement could be used to sterilize a static volume of liquid. In this case, a single liquid container will be used with an ultraviolet hood acting as a lid on the top of the ultrasonic irradiation cell.

Figure 20:
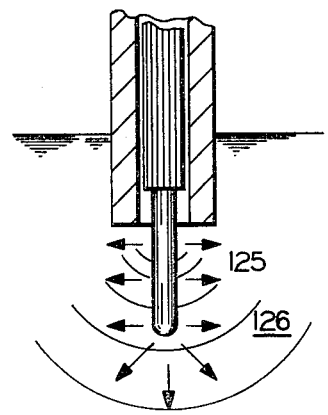
FIG. 20 is a vertical view, partly in section, of a modified tip used with the device of FIG. 19.
Figure 21:
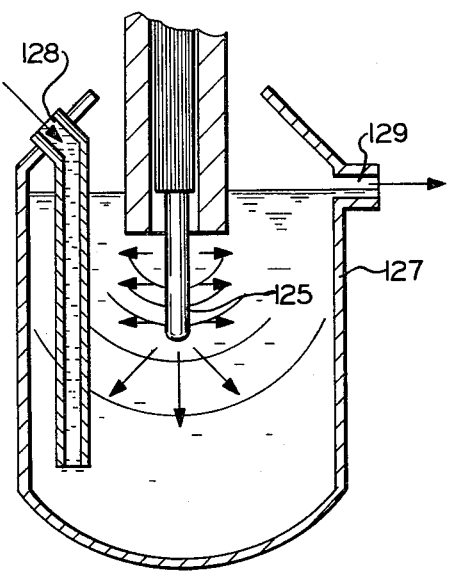
FIG. 21 is a view similar to that of FIG. 20 for the sterilizing of flowing liquids.
Figure 22:
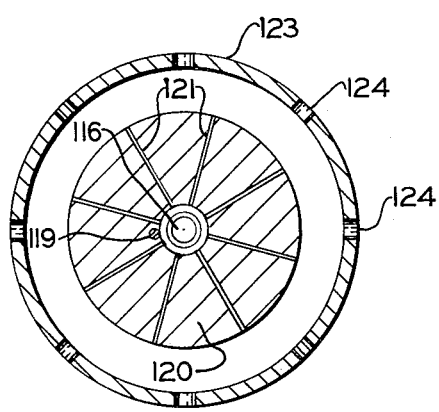
FIG. 22 is a sectional view taken on the lines 22—22 of FIG. 19, viewed in the direction of the arrows.

A still further embodiment of our invention can be seen in FIG. 19 which represents the vertical cross section of a portable sonic transducer combined with an ultraviolet lamp 125 for spot processing of contaminated liquids. As can be seen, the whole transducer assembly consists of a stainless steel back stub 111, two doughnut shaped piezoceramic elements 112 and a velocity transformer made of two sections. The first section 113 is a quarter wave magnesium stub, while the second section 114 is a half wave titanium or stainless steel step horn. The whole assembly is a solid of revolution. It is perforated in the center to allow the introduction of an ultraviolet lamp such as the Pen-ray (model 22 SC-35) made by Ultraviolet Products or any other ultraviolet lamp with the proper dimensions. A semi-rigid cable 116 connected to the power supply aids in positioning the ultraviolet lamp at various heights inside the hollow sonic tip 117. The quarter wave magnesium stub is firmly fastened to the half wave titanium stub by means of the bolt shown at 118. The high voltage electrical lead 119 is connected to the ceramic elements through a circular metal plate 120 with ribs 121 (FIG. 22) to allow better cooling, nylon bushings 122 are used to help improving the insulation of the ceramics from the back and front stubs. A cylindrical fastening ring 123 is used to achieve proper compression of the piezoceramic elements. The ring has several peripheric openings 124 to improve the overall heat transfer and cooling. The entire transducer assembly is calculated to operated under resonant conditions at a frequency of the order of between 15 and 50 kHz. The minimum acoustic power output radiated at the tip of the step horn is 25 watts. When in operation, the tip of this unit is submerged in the liquid and creates a strong cavitation field at a distance of a few inches from the vibrating tip. If the ultraviolet lamp 125 is lowered, as seen in FIG. 20 the ultraviolet flux of photons is released by the bulb 125 in an area 126 where cavitation shock waves are present. The combined effect of ultrasonic waves and ultraviolet photons energy in the vicinity of the tip creates the right synergistic conditions for a strong biocidal effect on any suspended microorganisms. For satisfactory operation with the sonic transducer of the type shown in FIGS. 19 and 20 the ultraviolet lamp must emit at least 40 microwatt per cm.$^2$ at a 12 inch distance in air. To make a proper use of the sonophotolysis effect with the portable sonic transducer hereabove described one can either irradiate small static volumes of liquids (a few hundred cubic centimeters) or process the liquid continuously with a glass or stainless steel cell 127 of the type shown in FIG. 21. The liquid is introduced with a pump or under static head in 128 and leaves the cell through the overflow 129 after combined ultrasonic-ultraviolet irradiation.

It is indeed obvious that, within the framework of the invention, other practical means may be used to achieve a high concentration flux of ultraviolet photons in the vicinity of the tip of a sonic transducer. One can use, for instance, a sonic transducer of the type shown in FIG. 19 without any axial hole and fasten an ultraviolet source at a few inches distance underneath or sideways in a cell of the type shown in FIG. 21.

Figure 23:
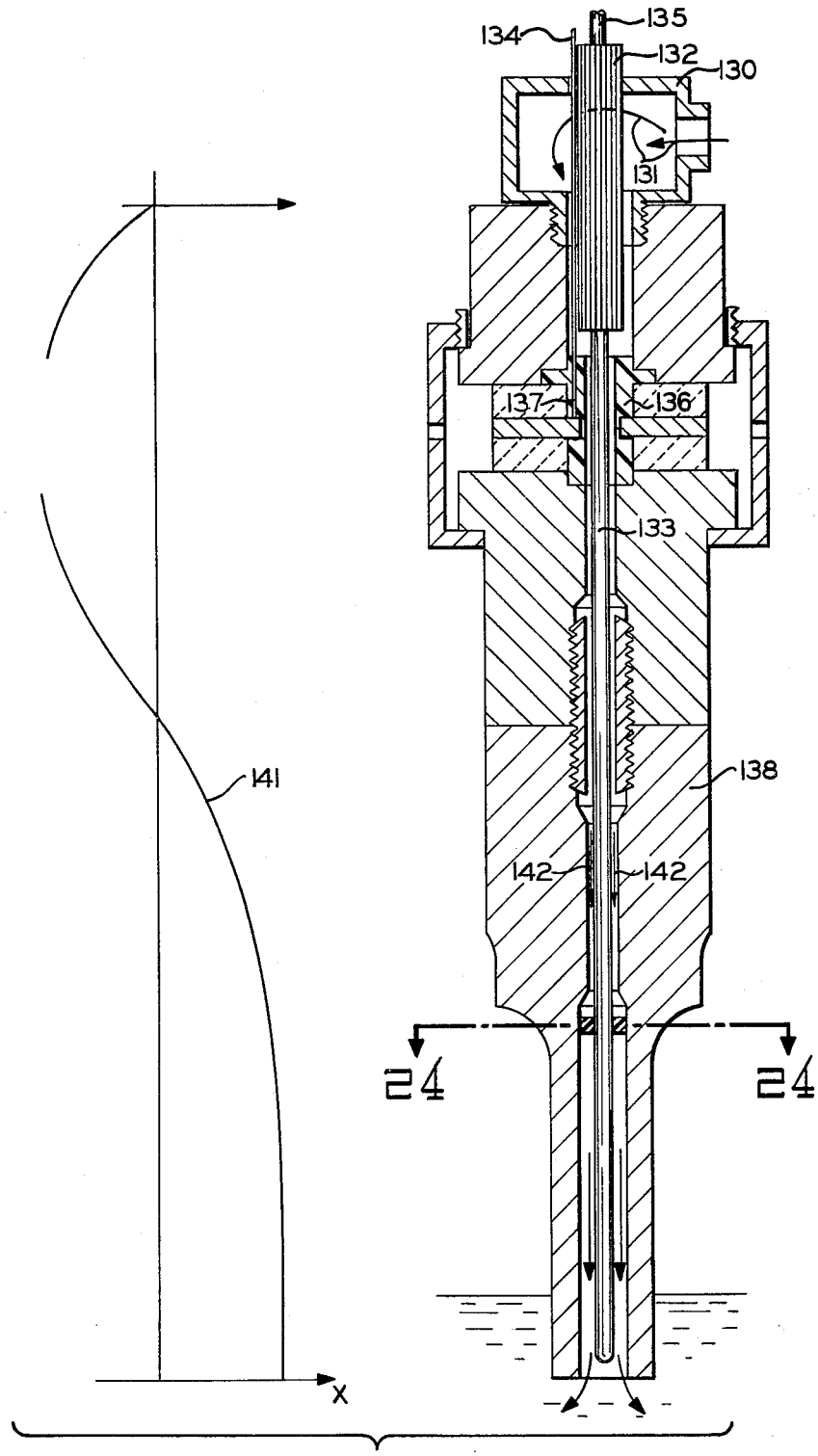
FIG. 23 is a view similar to that of FIG. 19 of a further embodiment utilizing the method of the invention wherein the liquid to be sterilized circulates inside the transducer assembly.

FIG. 23 shows an electro-acoustic transducer of the type previously described which has been modified to allow sterilization while the liquid circulates inside the transducer assembly. A hollow cap or chamber 130 has been fastened at the top of the unit to introduce the contaminated liquid 131. The chamber is also used to fasten the plastic holder 132 of the ultraviolet tube 133 and the outlet of the insulated electrical lead 134 which energizes the piezoelectric elements. Electric cable 135 connects the ultraviolet tube to its power supply. To allow the liquid to flow inside the axial hole of the transducer assembly a plastic hollow cylinder 136 made, for instance, of Teflon or nylon, separates the liquid from the ceramics. This plastic cylinder of revolution is perforated on one side 137 to leave an opening for the insulated lead which energizes the ceramics. The ultraviolet high intensity tube 133 used for this particular application has a diameter of at least 5/32 inch and an overall length of at least 8 to 9 inches. It is supported at mid distance on the axis of the velocity transformer 138 by a plastic perforated ring with several holes 140. The contaminated liquid 131 introduced at the top flows along the axis as indicated by arrows 142. Molecules or particles displacement along the liquid path is shown by curve 141 on the left side of FIG. 23. The tip of the unit is submerged in the liquid and part or all of the irradiated liquid can be recycled at the top of the electro-acoustic transducer. Such a set up allows a strong synergistic killing of microorganisms, since it provides a high intensity acoustic field (it could be a radial or longitudinal mode of vibration) at several spots on the axis of the unit in an area where we already have a concentrated flux of photons energy.

FIG. 25 is a longitudinal view of still another embodiment of the apparatus of the invention and is seen to comprise outer shell 150, having input orifice 152 and output orifice 154, inner fused quartz tube 156 having high ultraviolet transmission, ultraviolet tubes 158, and ultrasonic transducers 160 which are driven by driver 162 (details not shown). The liquid is circulated inside an annular chamber 155 whose outer surface is the inner surface of shell 150 and whose inner surface is the fused quartz tube 156. The ratio of the "surface area exposed to radiation" to the "volume of liquid treated" is high because the ultraviolet tubes 158 are inside the quartz envelope 156 and are very close to the envelope surface (of the order of ⅛"). The ultrasonic transducers may be individual piezoelectric ceramic transducers (as shown) or a continuous metal ring activated by magnetostrictive elements may be mounted at one end of the outer shell 150.

Figure 27:
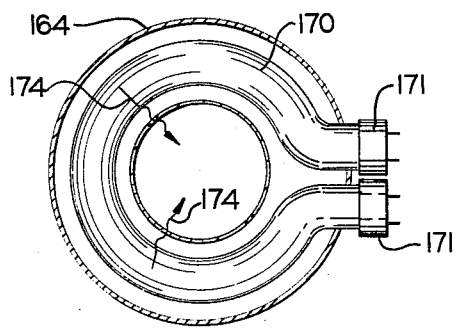
FIG. 27 is a sectional view taken on the lines 27—27 of FIG. 26, viewed in the direction of the arrows.

FIGS. 26 and 27 illustrate a still further embodiment of the invention. Outer shell 164 is preferably formed of polished stainless steel and is provided with liquid inlet orifice 166 and outlet orifice 168. Inner fused quartz tube 165 is mounted within the outer shell so that the liquid enters its interior. Several ultraviolet tubes 170 are mounted in the shell so as to radiate ultraviolet energy in the direction of arrows 174. An ultrasonic transducer 172 is mounted at one end of tube 165 so as to radiate ultrasonic energy in the direction of arrows 176.

The ultraviolet tubes 170 are provided with plugs 171 which may be connected to a source of electric power of the required voltage and current. Similarly, transducer 172 is connected to a suitable ultrasonic generator 173. The top of the chamber is closed by a metal reflecting plate 178. The ultraviolet tubes emit radiant energy all around the quartz tube and the reflective surfaces of the shell and the upper plate reflect the energy back toward the quartz tube 165 which contains the liquid being treated. The distance between the ultraviolet tubes and the quartz tube or vessel should be as short as possible (of the order of 1/8"). The diameter of the irradiation chamber (quartz tube) should preferably be less than 3". If greater diameters are used, an internal reflector 180 of stainless steel or similar reflecting material may be inserted in the processing chamber. This will improve the operation of large chambers using this particular structural configuration.

Figure 28:
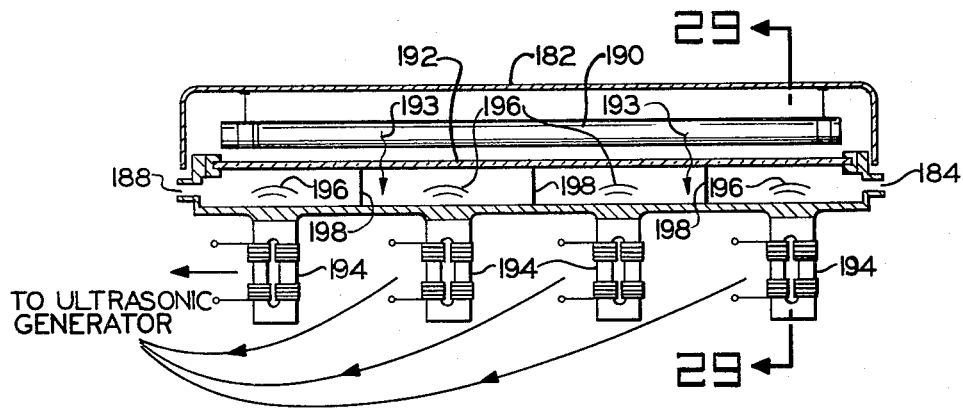
FIG. 28 is a longitudinal sectional view of a still further embodiment for carrying out the method of the invention.
Figure 29:
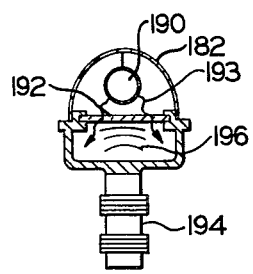
FIG. 29 is a sectional view taken on the lines 29—29 of FIG. 28, viewed in the direction of the arrows.
Figure 30:
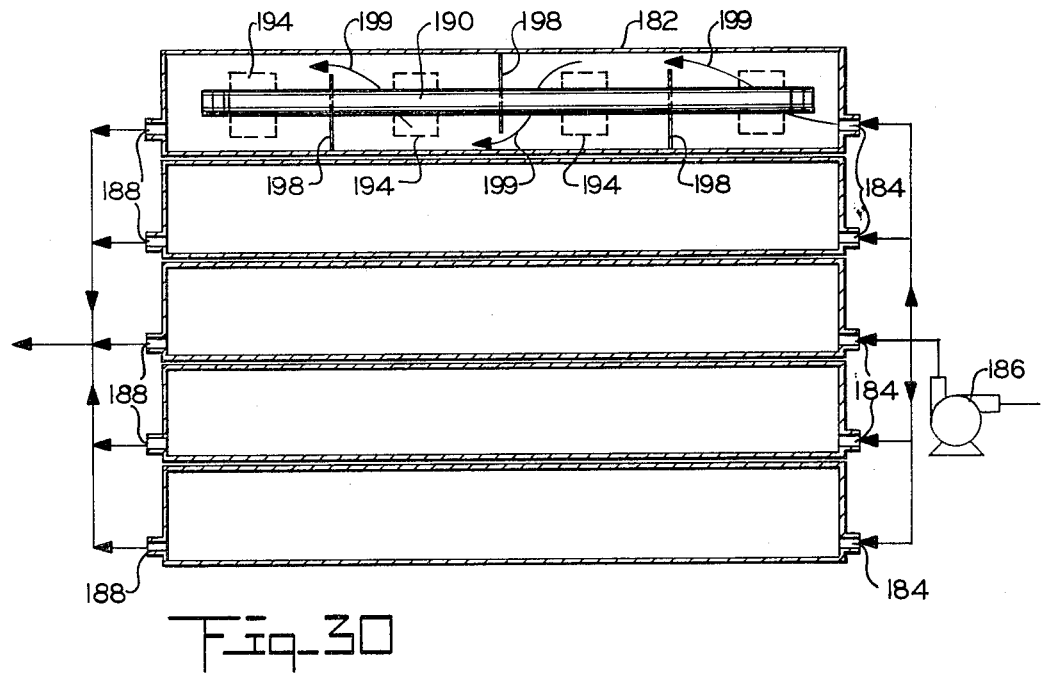
FIG. 30 is a top view of the embodiment of invention of FIGS. 28 and 29.
Figure 32:
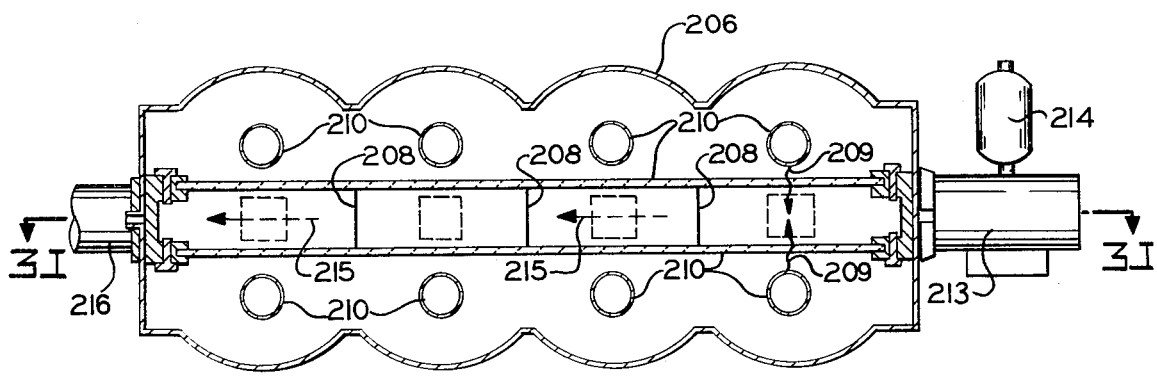
FIG. 32 is a sectional view taken on the lines 32—32 of FIG. 31, viewed in the direction of the arrows.

FIGS. 28, 29 and 30 illustrate a still further embodiment of the apparatus of the invention. Outer shell 182 is formed of reflective material such as stainless steel. It is provided with an input orifice 184 which feeds contaminated liquid supplied by pump 186. The purified liquid is delivered from the system through outlet orifice 188. FIG. 30 is a top view of a battery of five of these purifiers in parallel with only one of them shown in detail and with the top outer shell removed.

The source of ultraviolet energy is a single tube 190 a short distance from a plate 192 of fused quartz or other materials having high ultraviolet transmission characteristics and whose lower face is in contact with the liquid being treated. The ultraviolet energy is transmitted in the direction of arrows 193. The transducers 194 are suitably excited by a standard ultrasonic generator and emit ultrasonic energy as indicated by the wave fronts 196. The distance between plate 192 and the vibrating faces of transducers 194 should preferably be less than 2". Efficiency increases as this distance is decreased.

In order to increase the time in which the liquid being treated stays in the treatment chamber so as to be thoroughly exposed to the photons and the ultrasonic energy, a series of baffles 198 are located as shown in FIGS. 28 and 30. When so installed, the liquid flows as indicated by arrows 199 of FIG. 30.

Figure 31:
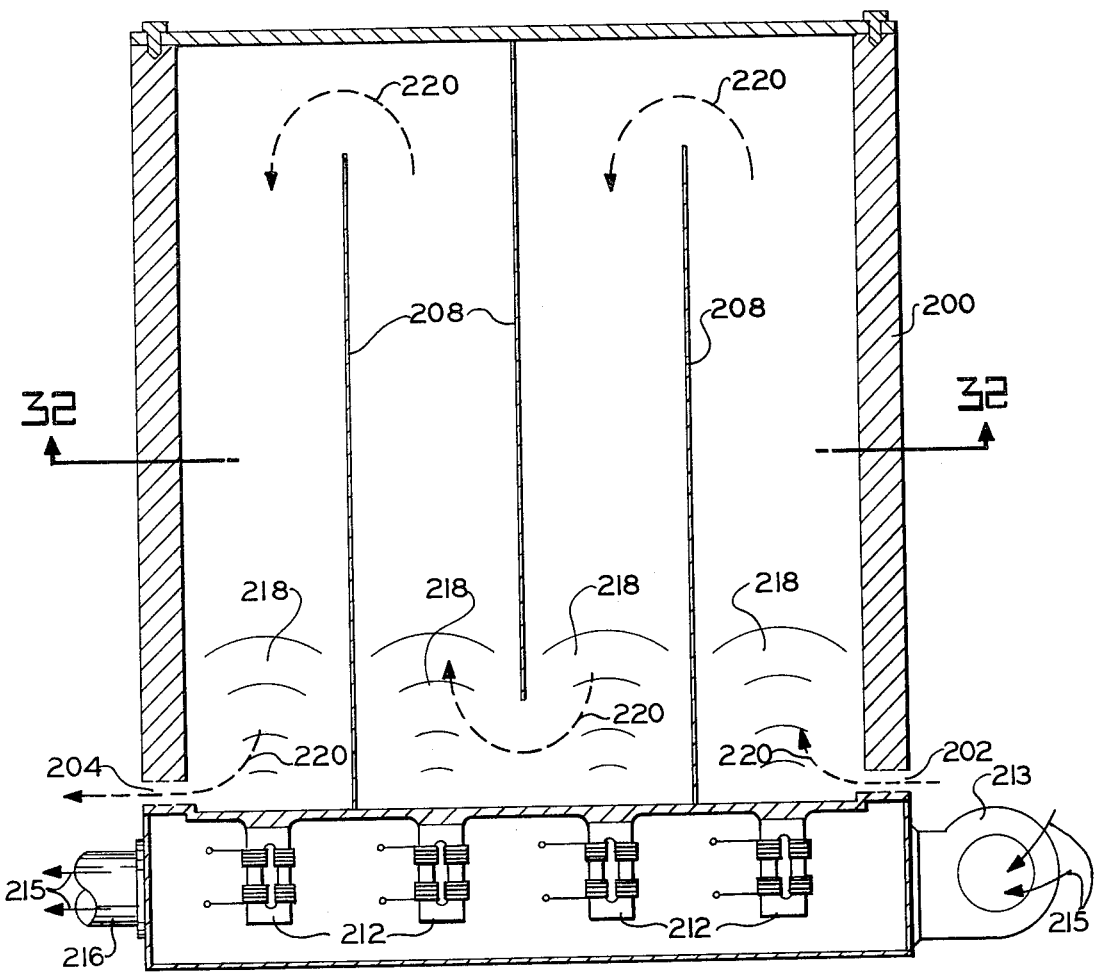
FIG. 31 is a schematic vertical view, partly in section of a still further embodiment for carrying out the method of the invention with the sources of ultraviolet emission removed for clarity.

Frame 200 (FIG. 31) is provided with an inlet 202 for admitting untreated liquid to enter the chamber and an outlet 204 from which purified liquid is drawn from the chamber. Outer shell 206 is formed of reflective material such as stainless steel and baffles 208 and frame 200 are formed of stainless steel or ultraviolet resistant plastic. Ultraviolet tubes 210 are mounted vertically so as to direct ultraviolet energy in the direction of arrows 209 through plates 210 into the liquid being treated which is confined between the plates 210. The plates 210 are formed of fused quartz, vycor glass or similar material which transmits ultraviolet energy with very small attenuation.

Magnetostrictive transducers 212 are excited in the usual manner and, since they are of the high power type, are cooled by means of fan 213 and motor 214 which moves the air across the transducers in the direction of arrows 215. The exhaust air leaves through outlet 216. The transducers emit energy into the liquid as indicated by wave fronts 218. Because of the baffles 208, the liquid flows through the chamber as indicated by arrows 220.

Without departing from the framework of the present invention it must be well understood that, according to the results desired, the present invention can be applied to variable volumes of liquids at different temperatures or at multiple pressures, and that, still without departing from the scope of the invention, the structural details of the described embodiments of apparatus, the dimensions and the shapes of their members (such as the ultraviolet lamp or transducer shape) and their arrangement (vertical or horizontal position of the sterilizers) may be modified, and that certain members may be replaced by other equivalent means (piezo-electric ceramic replaced, for instance, by magnetostrictive elements in the portable sonic ultraviolet irradiator).

Without limitation of the scope of the invention, following are several illustrative examples of the efficacy of the invention. For the sake of clarity, the examples all deal with the treatment of water streams artificially contaminated with *Escherichia coli*. This organism was chosen because it shows greater resistance than any of the waterborne enteric pathogens. In all cases the maximum turbidity of the water was 15 p.p.m. and 10 p.p.m. for the color. The total absorption coefficient was slightly lower than 0.2 per cm.

EXAMPLE 1

In this experiment, a sterilizing chamber of the type shown in FIG. 7, but equipped with four ultraviolet lamps (low pressure mercury type) was used. The amount of contaminated water handled corresponded to approximately 1500 gal. per hour. The ultraviolet energy output of the four ultraviolet tubes with quartz sleeves was 16 watts. The water temperature was 13° C. The sterilizer was equipped with four Langevin type transducers driven from a single generator at a frequency of 21 kHz. The acoustic energy density achieved inside the processing chamber was 25 watts/liter. With ultraviolet irradiation alone (no ultrasound) a killing efficiency of 99.6 percent was observed (1200 bacteria/ml. inlet, 4 bacteria/ml. outlet). With the combined synergistic effect of ultraviolet and ultrasound no bacteria was found in the outlet stream until the flow rate reached a value close to 5000 gal. per hour. During these tests the bacteria inlet concentration oscillated between 1200 and 1300 per ml. of control.

EXAMPLE 2

In this test, a sterilizing chamber of the type shown in FIG. 10 was used. The sterilizer comprised four ultraviolet lamps with a total output of 55.2 watts (input to the lamps, 160 watts). The average intensity of the ultraviolet emission at 2537 A. was 30,000 micro watt seconds per square cm. With a flow rate of 2000 gal. per hour, a hundred percent killing of *E. coli* (1500 per ml. inlet) was observed when using ultraviolet alone. The ultrasonic transducers fastened to the sterilizer tank produced an acoustic energy density level close to 30 watts per liter. When these transducers were activated with the ultraviolet emission the synergistic effect enabled us to increase the flow rate up to 6500 gal. per hour while still maintaining a hundred percent kill of *E. coli*.

EXAMPLE 3

In this test a sterilizing chamber of the type shown in FIG. 12 was used. The U-shaped ultraviolet lamp (Hanovia, model 88–A45) had a 10.4 watts output (input 35 watts). The 25 kHz. transducer fastened at the bottom of the processing chamber created an acoustic field with an energy density close to 20 watts per liter. The inlet water stream contained up to 900 *E. coli* organisms per ml. With ultraviolet radiation alone it was possible to achieve a 100% kill at a maximum flow rate of 250 gal. per hour. With the synergistic effect of combined ultraviolet and ultrasound, we were able to maintain a hundred percent kill after increasing the flow rate up to 600 gal. per hour.

EXAMPLE 4

In this test an experimental set up as seen in FIG. 14 was used. The ultraviolet airborne source was a Hanovia, Letheray, cold cathode tube with an output of 7.3 watts. The ultrasonic source was a Langevin type transducer driven at a resonance frequency of 42 kHz. The acoustic energy density in the liquid was close to 25 watts per liter. The surface area of the irradiated water film was slightly greater than 1 square foot. The number of *E. coli* organisms with ultraviolet irradiation alone was reduced of approximately 50% at a 300 gal. per hour flow rate. With the synergistic effect of combined ultraviolet and ultrasonics the killing rate raised to 100 percent at a flow rate close to 900 gal. per hour. The initial content of *E. coli* in water was 1000 organisms per ml.

EXAMPLE 5

The last example pertains to the use of sonic ultraviolet irradiator of the type shown in FIG. 19. The sonic transducer used in the experiment had a nominal frequency comprised between 20 and 23 kHz. It was fed by a 100 watt RF output generator. The acoustic energy radiated by the tip was comprised between 50 and 75 watts. The ultraviolet lamp (main emission at 2537 A.) had an intensity of 42 microwatts per cm.² measured in air at a 12 inch distance. The glass cell (see FIG. 21) used in our tests had a volume of 500 cm.³. The combined effect of ultrasonic with ultraviolet enabled us to reach a 100 percent kill of *E. coli* (original content 600 bacteria per ml.) at a flow rate comprised between 60 and 100 gal. per hour. Under the same experimental conditions only 50% of the *E. coli* was killed when using ultraviolet irradiation without ultrasound.

While the invention has been disclosed in relation to specific examples and embodiments, it is apparent to those skilled in the art that modifications are possible without departing from the spirit of the invention or the scope of the subjoined claims.

The embodiments of the invention in which an exclusive property or privilege is claimed are defined as follows:

1. A method of sterilizing liquids containing living organisms which comprises simultaneously subjecting the liquid to the emission of ultraviolet photons having a wavelength of the order between 1800 A. and 4500 A. and an intensity of 1 watt per square foot in air and 16,000 microwatt seconds per square centimeter in the liquid and to high intensity acoustic waves produced and propagated within the liquid and having a frequency of the order between 5 kHz. and 150 kHz. and an energy density in the liquid of the order of at least 1 watt per liter of liquid in the processing volume to thereby obtain synergistic effects for the destruction of the microorganisms.

2. The method of claim 1 wherein the ultraviolet photons are produced and propagated within the liquid.

3. The method of claim 1 wherein the liquid is exposed to gaseous atmosphere so that there is an interface between the liquid and the gaseous atmosphere and the ultraviolet photons are produced in the gaseous atmosphere and directed toward the said interface.

References Cited

UNITED STATES PATENTS

| | | | |
|---|---|---|---|
| 1,863,222 | 6/1932 | Hoermann | 21—54 R UX |
| 2,452,201 | 10/1948 | Levinson et al. | 21—102 R UX |
| 2,482,507 | 9/1949 | Rentschler et al. | 21—102 R UX |
| 2,717,874 | 9/1955 | Verain | 21—102 R UX |
| 2,721,941 | 10/1955 | McMaster et al. | 21—54 R X |
| 3,264,055 | 8/1966 | Barker | 21—54 R |
| 3,385,570 | 5/1968 | Pijls et al. | 134—1 X |

FOREIGN PATENTS

| | | | |
|---|---|---|---|
| 505,334 | 9/1951 | Belgium | 21—DIG. 2 |
| 671,922 | 5/1952 | Great Britain | 21—54 A |
| 947,700 | 1/1964 | Great Britain | 134—1 |

MORRIS O. WOLK, Primary Examiner

B. S. RICHMAN, Assistant Examiner

U.S. Cl. X.R.

21—54 A, 102 R, 102 A, DIG. 2; 134—1